United States Patent [19]
Anderson

[11] Patent Number: 5,561,823
[45] Date of Patent: Oct. 1, 1996

[54] MONITOR SYSTEM FOR DETERMINING THE AVAILABLE CAPACITY OF A READ BUFFER AND A WRITE BUFFER IN A DISK DRIVE SYSTEM

[75] Inventor: Steve Anderson, Loveland, Colo.

[73] Assignee: Conner Peripherals, Inc., San Jose, Calif.

[21] Appl. No.: 213,173

[22] Filed: Mar. 14, 1994

[51] Int. Cl.$^6$ .................................. G06F 5/06; H01J 3/00
[52] U.S. Cl. .......................... 395/872; 395/821; 395/877; 364/939; 364/239.7
[58] Field of Search ..................................... 395/275, 821, 395/872, 877, 876

[56] References Cited

U.S. PATENT DOCUMENTS

| | | | |
|---|---|---|---|
| 3,999,163 | 12/1976 | Levy et al. | 395/182.03 |
| 4,423,480 | 12/1983 | Bauer et al. | 395/280 |
| 5,121,480 | 6/1992 | Bonke et al. | 395/250 |
| 5,163,132 | 11/1992 | DuLac et al. | 395/873 |
| 5,249,271 | 9/1993 | Hopkinson et al. | 395/250 |
| 5,274,773 | 12/1993 | Squires et al. | 395/858 |
| 5,276,662 | 1/1994 | Shaver et al. | 369/32 |

FOREIGN PATENT DOCUMENTS

0473314A2  9/1991  European Pat. Off. .......... G06F 3/06
0528273A2  5/1992  European Pat. Off. .......... G06F 3/06

Primary Examiner—Alyssa H. Bowler
Assistant Examiner—Robert E. Stachler, II
Attorney, Agent, or Firm—Fliesler, Dubb, Meyer & Lovejoy

[57] ABSTRACT

A data buffer monitor apparatus which monitors the space availability in WRITE buffer and the number of sectors available for transfer in the READ buffer and generates the OK TO TRANSFER signal. The data buffers monitor apparatus includes a READ buffer monitor, a WRITE buffer monitor and a transfer controller. The READ buffer monitor monitors the total number of sectors stored in the READ buffer, the number of sectors in the READ buffer available for transfer to the host and generates a READ OK TO TRANSFER signal if the sectors for a requested READ operation are store in the READ buffer. The WRITE buffer monitor monitors the total number of sectors in the WRITE buffer and generates a WRITE OK TO TRANSFER signal if the WRITE monitor determines that a requested WRITE operation can be performed. The transfer controller in response to either the READ OK TO TRANSFER signal being generated by the READ buffer monitor if a READ operation has been request or the WRITE OK TO TRANSFER signal being generated by the WRITE buffer monitor if a WRITE operation has been requested generates a OK TO TRANSFER signal indicating the requested READ or WRITE operation transfer of sectors to and from the disk drive system may be performed by the disk drive.

20 Claims, 3 Drawing Sheets

MONITOR SYSTEM FOR DETERMINING THE AVAILABLE CAPACITY OF A READ BUFFER AND A WRITE BUFFER IN A DISK DRIVE SYSTEM

BACKGROUND OF THE INVENTION

1. Field of the Invention

The present invention relates to disk drive systems and, more specifically, to an apparatus for determining if space is available in a WRITE data buffer for a WRITE operation and if the sectors are available for transfer in a READ data buffer for a READ operation.

2. Description of the Related Art

In some present disk drive systems a READ buffer and a WRITE buffer are used to buffer data being transferred between the host and the disk. These buffers may be separate RAMs or can be a single RAM that is partitioned into the two separate buffers. The use of the READ and WRITE buffers allows the disk drive system to receive data from the host for storage in the WRITE buffer while, at the same time, retrieving data from the disk for storage in the READ buffer, or for transferring data from the WRITE buffer to the disk while, at the same time, transferring data from READ buffer 1 to the host.

In disk drive systems that use READ and WRITE buffers it becomes necessary to monitor the amount of data available in the READ buffer for a requested READ operation and the amount of space available in the WRITE buffer for a requested WRITE operation. A sector of data, 512 bytes of data, is the basic unit of transfer of data in many disk drive systems. Since in a READ and WRITE operation more than one sector may be transferred, the host will provide the disk drive system with the number of sectors to be transferred. Data is stored in the READ and WRITE buffers as sectors where each buffer can store up to 2,000 to 3,000 sectors.

The disk drive system has a microprocessor, under program control, which controls the overall operation of the disk drive system. One function performed by the microprocessor is to determine if a requested WRITE operation can be performed, that is, the availability of space within the WRITE buffer for a requested WRITE operation. If a requested READ operation can be performed, that is, the availability of sectors in the READ buffer for a requested READ operation and if the READ or WRITE operation can be performed, to generate an OK TO TRANSFER signal indicating the same in the disk drive system. The processing overhead on the microprocessor for performing this function can become large enough to degrade the overall disk drive system's performance and efficiency characteristics.

SUMMARY OF THE INVENTION

Accordingly, it is an object of the present invention to provide a data buffer monitor apparatus which monitors the space availability in the WRITE buffer and the number of sectors available for transfer in the READ buffer, and to generate the OK TO TRANSFER signal when a requested READ or WRITE operation from the host can be processed by the disk drive system.

It is another object of the present invention to provide a READ and WRITE buffer monitor apparatus to reduce the processing overhead on the microprocessor, thereby increasing the overall performance and efficiency characteristics of the disk drive system.

It is another object of the present invention to provide a READ and WRITE buffer monitor apparatus that continuously monitors the transfer of data sectors between the READ and WRITE buffers, and the host and the disk.

Briefly, the data buffer monitor apparatus comprises a READ buffer monitor, a WRITE buffer monitor and a transfer controller. The READ buffer monitor monitors the total number of sectors stored in the READ buffer and the number of sectors in the READ buffer available for transfer to the host, and generates a READ OK TO TRANSFER signal if the READ monitor determines that the sectors for a requested READ operation are stored in the READ buffer and can be transferred to the host. The READ buffer stores both sectors that are available for transfer to the host and sectors which are being held in the READ buffer after the sector has been transferred to the host. The READ buffer monitor also determines if the READ buffer is full and will generate a BUFFER FULL signal when such is the case to prevent the overwriting of sectors in the READ buffer by the disk drive. The WRITE buffer monitor monitors the total number of sectors in the WRITE buffer and generates a WRITE OK TO TRANSFER signal if the WRITE monitor determines that a requested WRITE operation can be performed by the disk drive system. The WRITE buffer stores sectors released to be transferred to the disk and unreleased sectors which are being accumulated in the WRITE buffer for the WRITE request being processed, which will be released after all the sectors for the WRITE operation have been transferred to the WRITE buffer. The transfer controller, in response to either the READ OK TO TRANSFER signal being generated by the READ buffer monitor if a READ operation has been requested, or the WRITE OK TO TRANSFER signal being generated by the WRITE buffer monitor if a WRITE operation has been requested, generates an OK TO TRANSFER signal indicating that the requested READ or WRITE operation transfer of sectors to and from the disk drive system may be performed by the disk drive.

An advantage of the hardware data buffer monitor apparatus is the reduction of the processing overhead on the microprocessor.

Another advantage of the hardware data buffer monitor apparatus is the ability to maintain up-to-date records of the status of the READ and WRITE buffers such that a decision can be efficiently and quickly made as to when a requested READ or WRITE operation of a given block size of sectors can be undertaken by the disk drive system for the transfer of sectors to and from the disk drive system.

BRIEF DESCRIPTION OF THE DRAWINGS

The invention will be described with respect to the particular embodiments thereof and references will be made to the drawings, in which.

DESCRIPTION OF THE PREFERRED EMBODIMENTS

Figure 1:
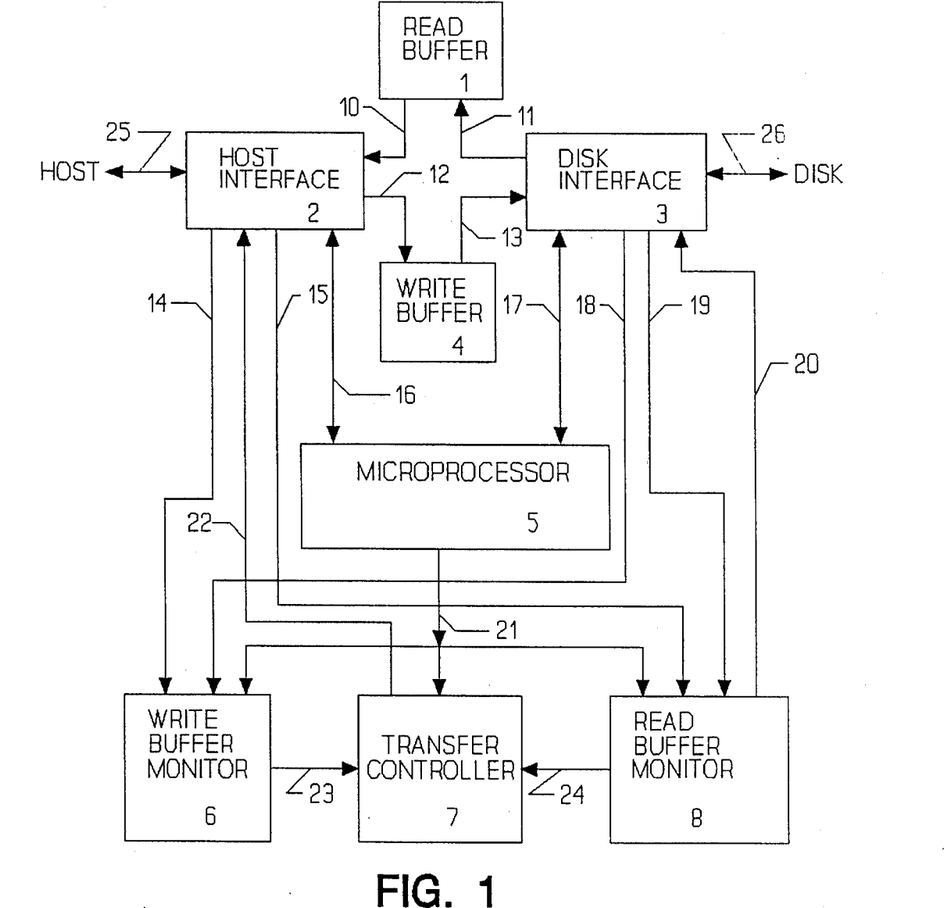
FIG. 1 is a diagram of a disk drive system including a data buffer monitor apparatus which includes a READ buffer monitor, a WRITE buffer monitor and the transfer controller.

FIG. 1 shows the overall block diagram of the disk drive system embodying the present invention. The host exchanges data and control signals with host interface 2 via bus 25 in the disk drive system. The disk exchanges data and control signals with disk interface 3 via bus 26. Microprocessor 5 communicates with host interface 2 via bus 16 to control the transfer of data from READ buffer 1 to host interface 2 via bus 10, and the transfer of data from host interface 2 to WRITE buffer 4 via bus 12. Microprocessor 5 communicates with disk interface 3 via bus 17 to control the transfer of data from WRITE buffer 4 to disk interface 3 via bus 13, and the transfer of data from disk interface 3 to READ buffer 1 via bus 11.

Host interface 2 generates a SECTOR TRANSFER FROM HOST signal on line 14 to the WRITE buffer monitor 6 each time a sector is transferred from the host to the WRITE buffer 4 in the disk drive system, and a SECTOR TRANSFER TO HOST signal on line 15 to READ buffer monitor 8 each time a sector is transferred from the READ buffer 1 in the disk drive system to the host.

Disk interface 3 generates a SECTOR TRANSFER TO DISK signal on line 18 to the WRITE buffer monitor 6 each time a sector is transferred from the WRITE buffer 4 to the disk and a SECTOR TRANSFER FROM DISK signal on line 19 to READ buffer monitor 8 each time a sector is transferred from the disk to READ buffer 1.

Microprocessor 5 communicates control signals with WRITE buffer monitor 6, READ buffer monitor 8 and transfer controller 7 via bus 21. The control signals on bus 21 include a WRITE BLOCK signal on line 21-3, which release the sectors accumulated in the WRITE buffer 4 during a WRITE operation for transfer to the disk, a BLOCK COUNT signal on bus 21-5, which is the number of sectors requested to be transferred during a requested READ or WRITE operation, a CLOCK signal on line 21-4 for controlling timing, a READ BLOCK signal on line 21-6 which indicates either a READ retention mode or a READ ring mode of operation for READ monitor 8, and releases the location of held sectors in the READ buffer monitor 8 after exiting from the READ retention mode, a MULTIPLE BLOCKS signal on line 21-7 indicating to READ buffer monitor 8 whether one or more than one sectors are requested for transfer during a READ operation and a READ MODE signal on line 21-1 to the transfer controller 7 indicating whether the requested operation is a READ or WRITE operation.

WRITE buffer monitor 6 maintains the total number of sectors stored in the WRITE buffer 4, the number of stored sectors released for transfer to the disk and the number of stored sectors not released for transfer to the disk. WRITE buffer monitor 6 will generate a WRITE OK TO TRANSFER signal on line 23 to transfer controller 7 if the WRITE buffer 4 has sufficient space to receive the number of sectors indicated by the BLOCK COUNT signal for the pending operation.

READ Buffer monitor 8 maintains the total number of sectors stored in the READ buffer 1, the number of stored sectors available for transfer to the host and the number of sectors after having been transferred to the host are being held in the READ buffer 1. READ buffer monitor 8 will generate a READ OK TO TRANSFER signal on line 24 to transfer controller 7 if the READ buffer 1 has a sufficient number of sectors available to be transferred to the host as indicated by the BLOCK COUNT signal for the pending READ operation. READ buffer monitor 8 generates a BUFFER FULL signal on line 20 to disk interface 3 to prevent the disk from overwriting sectors in the READ buffer 1 when the READ buffer 1 is full.

Transfer controller 7 generates an OK TO TRANSFER signal on line 22 to host interface 2, if the operation is a READ operation, and a READ OK TO TRANSFER signal is received from READ buffer monitor 8, or the operation is a WRITE operation and a WRITE OK TO TRANSFER signal is received from WRITE buffer monitor 6.

TRANSFER CONTROLLER

Figure 2:
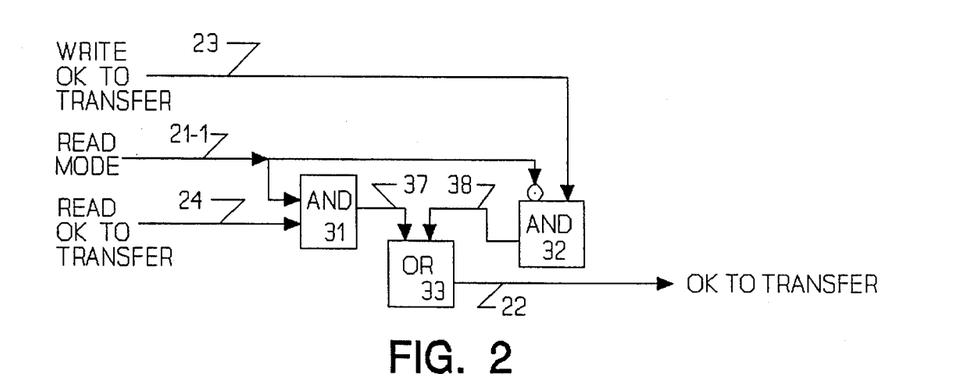
FIG. 2 is a logic diagram of the transfer controller.

Referring to FIG. 2, transfer controller 7 includes AND 31, AND 32 and OR 33. AND 31 is conditioned by the coincidence of the READ MODE signal being high from microprocessor 5 on line 21-1 of bus 21, indicating the READ mode and the READ OK TO TRANSFER signal being high on line 24 from READ buffer monitor 8. AND 31 when so conditioned causes a OK TO TRANSFER signal to be high on line 37 which is connected to OR 33. AND 32 is conditioned by the coincidence of the READ MODE signal being low from microprocessor 5 on line 21-1 of bus 21, indicating the WRITE mode and the WRITE OK TO TRANSFER signal being high on line 23 from WRITE buffer monitor 6, and when so conditioned causes an OK TO TRANSFER signal to be high on line 38 which is connected to OR 33. OR 33 causes an OK TO TRANSFER signal to be high on line 22 to host interface 2 whenever an OK TO TRANSFER SIGNAL is present on either lines 37 or 38, thereby indicating the requested transfer of sectors for a requested READ or WRITE operation from the host may be processed by the disk drive system.

WRITE BUFFER MONITOR

Referring to FIG. 3, AND 40, 41 and 43 and Cyclic Counter 42 form a state machine for generating a series of RELEASE signals on line 57 whenever there is coincidence between the WRITE BLOCK signal being high on line 21-3 of bus 21 and the NOT ZERO signal being high on line 51 by zero detector 44.

Figure 3:
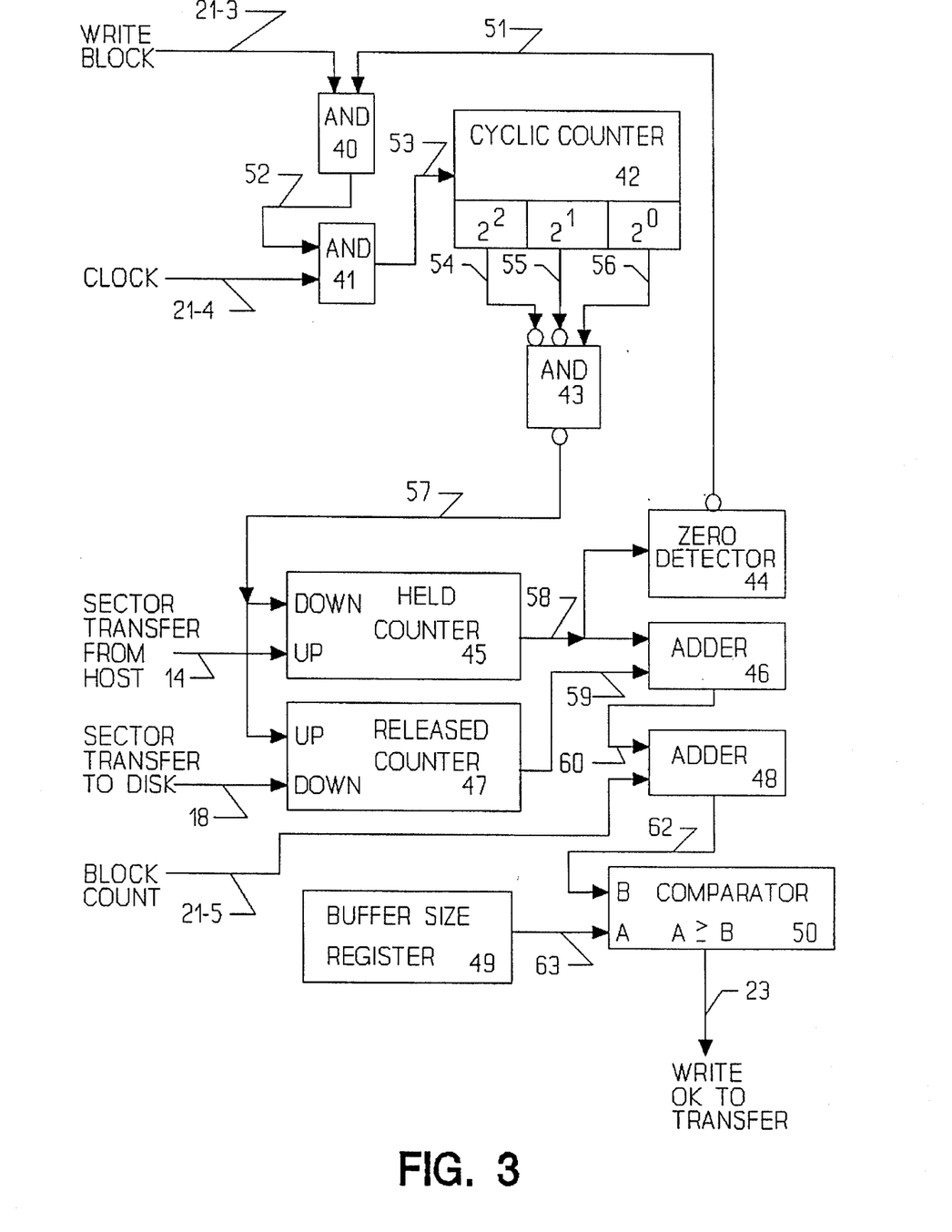
FIG. 3 is a logic diagram of the WRITE buffer monitor.

AND 40 is conditioned by the coincidence of the WRITE BLOCK signal being high on line 21-3 of bus 21 and the NOT ZERO signal being high on line 51 by zero detector 44. The WRITE BLOCK signal is raised to release the sectors being held in WRITE buffer 4 for transfer to the disk. The NOT ZERO signal is high on line 51 whenever zero detector 44 detects that the count in held counter 45 is greater than zero, indicating that sectors are being held in WRITE buffer 4. AND 41 gates the CLOCK signal on line 21-4 to cyclic counter 42 when AND 40 is conditioned. Cyclic counter 42 counts in the following sequence:

000
001
011
010
110
111
101
100
000.

Cyclic counter 42 is a three stage counter which counts in the above sequence such that only one stage changes state in response to a CLOCK signal, thereby improving the settling time of cyclic counter 42 such that cyclic counter 42 can be stepped at the frequency of the CLOCK signal. The count in cyclic counter 42 is monitored by AND 43. AND 43 will raise the RELEASE signal on line 57 during the time that cyclic counter 42 contains the count of 001 as indicated on lines 54, 55 and 56, respectively. Line 57 is connected to the DOWN input of held counter 45 and the UP input of released counter 47.

The SECTOR TRANSFER FROM HOST signal on line 14 from host interface 2 is connected to the UP input of held counter 45. The count output of held counter 45 is connected by bus 58 to zero detector 44 and adder 46. The SECTOR TRANSFER TO DISK signal on line 18 from disk interface 3 is connected to the DOWN input of released counter 47 and decreases the count by 1 each time the SECTOR TRANSFER TO DISK signal is received by released counter 47. The count output of released counter 47 is connected by bus 59 to adder 46. Adder 46 combines the counts from held counter 45 and released counter 49 to form a sub-total count output on bus 60 which indicates the number of sectors presently being used in WRITE buffer 4. The sub-total count output of adder 46 is connected via line 60 to adder 48. The BLOCK COUNT signal on bus 21-5 is connected to adder 48. ADDER 48 combines the number of sectors to be transferred as represented by the BLOCK COUNT signal and the sub-total count from adder 46 to produce a total sector count output on bus 62 to the B input of comparator 50.

Buffer size register 49 contains the count of the maximum number of sectors that can be stored in WRITE buffer 4. The count value of buffer size register 49 is connected via line 63 to the A input of comparator 50. When the total count on line 62 is less than or equal to the buffer size register 49 count, then comparator 50 will raise the WRITE OK TO TRANSFER signal on line 23 which is connected to transfer controller 7.

The operation of WRITE buffer monitor 6 will be described by the following examples. First, assume the following set of conditions: the count in buffer size register 49 is 2000, the count in released counter 47 is 500, the count in held counter 45 is 0, the BLOCK COUNT signal has a value of 100, a WRITE operation is requested by the host, and the WRITE BLOCK signal on line 21-3 is low. Under these conditions the sub-total count of adder 46 is 500 and the total count of adder 48 is 600. Comparator 50's output, WRITE OK TO TRANSFER signal on line 23, which is connected to transfer controller 7, is high since the total count of 600 from adder 48 is less than the buffer size count of 2000. AND 32 will be conditioned in transfer controller 7 thereby causing the OK TO TRANSFER signal to be high on line 22 to host processor 2. Host processor 2, upon receiving the OK TO TRANSFER signal, will initiate the process of transferring sectors from the host to the disk drive for the WRITE request. Each time a sector is transferred from the host to the disk drive system, host interface 2 will generate a SECTOR TRANSFER FROM HOST signal on line 14 which will increase by 1 the count in held counter 45. After the last of the 100 sectors of the WRITE request have been transferred, the count in held counter 45 will be 100 and the count in released counter 47 will be 500. Microprocessor 5 will raise the WRITE BLOCK signal on line 21-3. The NOT ZERO signal on line 51 will be high since held counter 45's count is not equal to zero. AND 40 is conditioned thereby allowing CLOCK signals to be gated to cyclic counter 42. Each time cyclic counter 42 has the count of 001, a RELEASE signal is generated on line 57 which will decrease the count in held counter 45 and will increase the count in released counter 47. When held counter 45 is decreased to the count of 0, the NOT ZERO signal on line 51 will be low thereby deconditioning AND 40 resulting in no further CLOCK signals being gated to cyclic counter 42. At this time the count in held counter 45 will be 0 and the count in released counter 47 will be 600.

Further, released counter 47 includes an arbitration circuit that deals with the situation of a RELEASE signal and a SECTOR TRANSFER TO DISK signal being presented to released counter 47 at the same time. The arbitration circuit will first process the RELEASE signal and then the SECTOR TRANSFER TO DISK signal before the time of issuance of the next RELEASE signal. The cyclic counter 42 is used to allow settling time for the held counter 45 and the released counter 47 after being changed.

Next assume the following set of conditions: the count in buffer size register 49 is 2000, the count in released counter 47 is 1500, the count in held counter 45 is 0, the BLOCK COUNT signal has a value of 600 and a WRITE operation is requested by the host. Under these conditions the sub-total count of adder 46 is 1500 and the total count of adder 48 is 2100. The WRITE OK TO TRANSFER SIGNAL on line 23 from comparator 50 will be low since the total count of 2100 from adder 48 is greater than the buffer size of 2000. Each time a sector is transferred to the disk, disk interface 3 will generate a SECTOR TRANSFER TO DISK signal which will decrease the count by 1 in released counter 47. In this example, once 100 sectors have been transferred to the disk from the write buffer 4, comparator 50 will raise the WRITE OK TO TRANSFER signal since the total count of 2000 from adder 48 is equal to the buffer size of 2000. The pending WRITE request can then be processed since there is now enough room in WRITE buffer 4 to store the 600 sectors associated with the pending WRITE request.

READ BUFFER MONITOR 8

Figure 4:
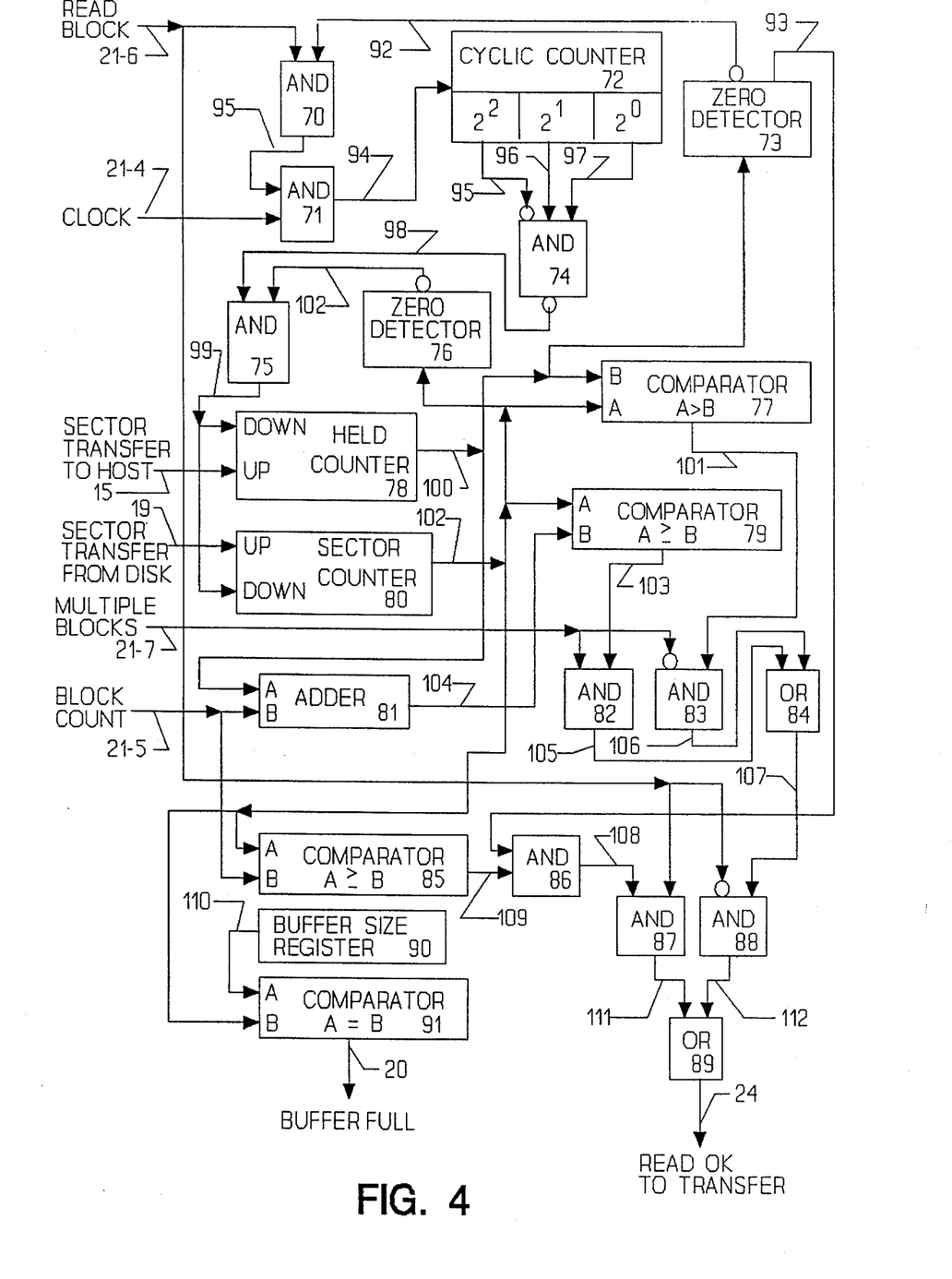
FIG. 4 is a logic diagram of the READ buffer monitor.

The READ operation has two modes, a retention mode and a ring mode. In the retention mode, sectors are transferred from the READ buffer 1 to the host and are maintained in the READ buffer 1 until released. The retention allows the READ operation to be completed while all the transferred sectors are still available in the READ buffer 1 for transfer to the host if the host should so require re-transfer of the sectors. This mode thereby saves the time of retrieving those same sectors from the disk to the READ buffer 1. Once it is determined that the sectors can be released, the location of those sectors in the READ buffer 1 are made available for storage of new sectors retrieved from the disk. In the ring mode sectors are transferred to the disk and the sector's location in READ buffer 1 is immediately made available for storage of a new sector retrieved from the disk. The retention mode is indicated by the READ BLOCK signal being low and the ring mode by the READ BLOCK signal being high.

Referring to FIG. 4, AND 70, 71, 74 and 75 and cyclic counter 72 form a state machine for generating a series of RELEASE signals on line 99 whenever there is coincidence between the READ BLOCK signal being high on line 21-6 of bus 21, the NOT ZERO signal being high on line 92 and the NOT ZERO signal being high on line 102.

AND 70 is conditioned by the coincidence of the READ BLOCK signal being high on line 21-6 of bus 21 and the NOT ZERO signal being high on line 92. The READ BLOCK signal is raised to add the count of held counter 78 to sector counter 80 when sectors are released that were being held in READ buffer 1 and to indicate the ring mode of operation. The NOT ZERO signal on line 92 is high whenever sectors are being held in READ buffer 1, indicated by held counter 78 having a count greater than zero. When AND 70 is conditioned AND 71 gates the CLOCK signal on line 21-4 to step the cyclic counter 72. Cyclic counter 42 counts in the following sequence:

000

001
011
010
110
111
101
100
000.

Cyclic counter 72 is a three stage counter and counts in the above sequence such that only one stage changes state in response to a CLOCK signal. This method of counting improves the settling time of cyclic counter 72 such that cyclic counter 72 can be stepped at the frequency of the CLOCK signal. The count in cyclic counter 72 is monitored by AND 74 which will produce a RELEASE signal on line 98 during the time that cyclic counter 72 contains the count of 011, as indicated on lines 95, 96 and 97 respectively. AND 75 will gate the RELEASE signal on line 98 onto line 99 when sector counter 80 has a count greater than zero such that zero detector 76's NOT ZERO output signal on line 102 is high thereby conditioning AND 75. Line 99 connects the output of AND 75 to the DOWN input of held counter 78 and the DOWN input of sector counter 80.

The SECTOR TRANSFER TO HOST signal on line 15 from host interface 2 is connected to the UP input of held counter 78. The count output of held counter 78 is connected by bus 100 to zero detector 73, the B input of comparator 77 and the A input of adder 81. Zero detector 73 will raise the NOT ZERO signal on line 92 whenever the count in held counter 78 is greater than zero.

The SECTOR TRANSFER FROM DISK signal on line 19 from disk interface 3 is connected to the UP input of sector counter 80 and increases the count by one each time the SECTOR TRANSFER FROM DISK signal is received by sector counter 80. The count in sector counter 80 is the total number of sectors stored in READ buffer 1, that is the number of sectors already transferred but being held in READ buffer 1 plus the number of sectors awaiting to be transferred from READ buffer 1. The output of sector counter 80 is connected by bus 102 to the A input of comparator 77, to the A input of comparator 79, to zero detector 76, to the A input of comparator 85 and to the B input of comparator 91. The BLOCK COUNT on bus 21-5 is connected to the B input of adder 81. Adder 81 combines the number of sectors to be transferred as represented by the BLOCK COUNT signal with the number of sectors being held in READ buffer 1 as indicated by held counter 78 to form a retention count. The retention count output of adder 81 on bus 104 is connected to the B input of comparator 79. MULTIPLE BLOCKS signal on line 21-7 when high partially conditions AND 82 to indicate that more than one sector is to be transferred by the pending READ request, and when low partially conditions AND 83 to indicate that only 1 sector is to be transferred by the pending READ request.

Buffer size register 90 contain the count of the maximum number of sectors that can be stored in READ buffer 1. The count output of buffer size register 90 is connected via bus 110 to the A input of comparator 91. When the count output of sector counter 80 on line 102 is equal to the count output of buffer size register 49, then comparator 91 will raise the BUFFER FULL signal on line 20 to the disk interface 3. The BUFFER FULL signal being high will inhibit the transfer of sectors from the disk to the READ buffer 1, thereby preventing any sector stored in READ buffer 1 from being overwritten.

Comparator 77 determines if the count on line 100 (the number of sectors being held in held counter 78) is less than the count on line 102 (the number of sectors in sector counter 80 or the number of sectors in READ buffer 1) and if such is the case the output signal from comparator 77 on line 101 is high. The RETENTION SINGLE OK TO TRANSFER output signal of AND 83 will be high when both the output signal on line 101 is high and the MULTIPLE BLOCKS signal is low on line 21-7, indicating that only one sector is to be transferred in the retention mode and at least one sector is available for transfer in READ buffer 1. The RETENTION SINGLE OK TO TRANSFER signal on line 106 is connected to OR 84.

Comparator 79 determines if the count output of adder 81 on line 104, indicating the sum of the number of sectors being held in held counter 78 plus the number of sectors requested to be transferred count, is less than or equal to the count output of sector counter 80 on line 102, indicating the number of sectors in the READ buffer 1. If such is the case, an output signal from comparator 79 will be high on line 103. The RETENTION MULTIPLE OK TO TRANSFER output signal on line 105 of AND 82 will be high when the output signal on line 103 is high and the MULTIPLE BLOCKS signal is high on line 21-7, indicating that more than one sector is to be transferred and at least the number of sectors requested for transfer are available for transfer in READ buffer 1. The RETENTION MULTIPLE OK TO TRANSFER signal on line 105 is connected to OR 84.

The RETENTION OK TO TRANSFER output signal of OR 84 is connected to AND 88 via line 107 and will be high when either the RETENTION SINGLE OK TO TRANSFER signal is high or the RETENTION MULTIPLE OK TO TRANSFER signal is high. The RETENTION OK TO TRANSFER signal on line 107 will be gated through AND 88 to OR 89 via line 112 when the READ BLOCK signal is low on line 21-6.

Comparator 85 determines if the number of sectors to be transferred by the pending READ request as indicated by the BLOCK COUNT signal on bus 21-5 is less than or equal to the count of the number of sectors in the READ buffer 1 count on line 102 and, if such is the case, the output signal from comparator 85 on line 109 will be high. The RING OK TO TRANSFER output signal of AND 86 will be high when both the output of comparator 85 on line 109 is high, indicating that the number of sectors in the READ buffer 1 are greater than the number of sectors requested to be transferred from the READ buffer 1, and the ZERO signal on line 93 is high, indicating that no sectors are being held in READ buffer 1 and that all sectors in READ buffer 1 are available for transfer. The RING OK TO TRANSFER signal on line 108 is gated through AND 87 to OR 89 via line 111 when the READ BLOCK signal is high on line 21-6.

The READ OK TO TRANSFER output signal of OR 89 on line 24 is high when either the RING OK TO TRANSFER signal on line 111 is high or the RETENTION OK TO TRANSFER on line 112 is high.

The operation of the READ buffer monitor 8 will be explained by the following examples. First, assume that a READ request has been made for the transfer of 1 sector from the READ buffer 1 to the host in the retention mode, the BLOCK COUNT signal equals 1, the count in held counter 78 is 0, the count in sector counter 80 is 0 and the MULTIPLE BLOCK signal is low. Under these conditions the output of comparators 77, 79 and 85 will be low and the READ OK TO TRANSFER signal will be low on line 24. When the disk retrieves the next sector from the disk and stores that sector in READ buffer 1, the disk interface 3 will generate a SECTOR TRANSFER FROM DISK signal on line 19 which will step the count in sector counter to 1. Now the output of comparators 77, 79 and 85 will all be high causing the RETENTION SINGLE OK TO TRANSFER signal on line 106 to be high, the RETENTION OK TO TRANSFER signal on line 107 to be high and the RING OK TO TRANSFER signal on line 108 to be high. The READ OK TO TRANSFER signal on line 24 will be high since AND 88 will be conditioned by the READ BLOCK signal on line 21-6 being low and the RETENTION OK TO TRANSFER signal on line 107 being high. Transfer controller 7 will raise the OK TO TRANSFER signal to high on line 22 from transfer controller 7 to host interface 2.

Host interface 2 will then initiate the processing of the READ request and one sector will be transferred from READ buffer 1 to the host. Host interface 2 will generate a SECTOR TRANSFER FROM HOST signal on line 14 which will increment held counter to 1. At this time the count in held counter 45 is 1 and the count in released counter 47 is 1, indicating that the sector in the READ buffer 1 has been transferred to the host and there are no other sectors in the READ buffer 1 available for transfer to the host.

Next assume that the host issues another READ request in the retention mode for transferring 5 sectors from the READ buffer 1 to the host. Under these conditions the outputs will be low for comparators 77, 79 and 85 thereby causing the READ OK TO TRANSFER signal on line 24 to be low. The host interface 2 will not attempt to transfer any sectors from the READ buffer 1 to the host. As sectors are retrieved from the disk and stored in READ buffer 1, disk interface 3 generates a SECTOR TRANSFER FROM DISK signal after each sector is transferred on line 19 which will increment the count in sector counter 80 to increase by 1. As soon as the sector counter reaches the count of 2, the output signal on line 101 of comparator 77 will be high since the count of 2 in sector register 80 is greater than the count of 1 in held counter 78. The output of AND 83 will be low because multiple sectors are being transferred, therefore the MULTIPLE BLOCKS signal is high on line 21-7. Therefore the READ OK TO TRANSFER signal on line 24 will remain low.

When the sector counter 80 reaches the count of 6 the output signal of comparator 79 will be high, resulting in the RETENTION OK TO TRANSFER signal on line 107 being high. Since the retention mode is being used, the READ BLOCK signal is low on line 21-6 of bus 21 which will gate the RETENTION OK TO TRANSFER signal through AND 88 to OR 89. The READ OK TO TRANSFER signal will be high on line 24 and the OK TO TRANSFER signal on line 22 to host interface 2 will be high.

Host interface 2 will initiate the processing of the READ request from the host and 5 sectors will be transferred from the READ buffer 1 to the host. Host interface 2 will generate a SECTOR TRANSFER TO HOST signal on line 15 to increment held counter 78 after each sector has been transferred to the host. After the READ request has been processed by microprocessor 5 the held counter 78 has a count of 6 and the sector counter has a count of 6, thereby indicating that all the sectors in READ buffer 1 have been transferred to the host and no sectors are available in READ buffer 1 for transfer to the host.

Next assume that the host issues a READ request for 10 sectors in the ring mode. When this READ request is received the READ BLOCK signal on line 21-6 will be high, the BLOCK COUNT signal on line 21-5 will have a value of 10 and the MULTIPLE BLOCK signal will be high since more than one sector is requested to be transferred to the host. Under these conditions the outputs of comparators 77, 79 and 85 are all low since the count in the sector counter is less than 10 and, therefore, the READ OK TO TRANSFER signal on line 24 will be low and the OK TO TRANSFER signal on line 22 will be low. Host interface 2 will not initiate the transfer of sectors from READ buffer 1 from the host. Disk interface 3 will initiate the retrieval of the requested sectors from the disk and will store the requested 10 sectors in READ buffer 1.

Since the READ BLOCK signal is high on line 21-6 and the NOT ZERO signal on line 92 is high, in that the count in held counter 78 is greater than 1, AND 70 will be conditioned which will allow CLOCK signals to step cyclic counter 72. Each time cyclic counter reaches the count of 011 the RELEASE signal on line 98 will be gated through AND 75 since the NOT ZERO signal is high on line 102, indicating that the count in sector counter 80 is greater than 0. Each RELEASE signal on line 99 will decrement the count in held counter 78 and sector counter 80. When held counter reaches 0, AND 70 will be deconditioned thereby blocking the CLOCK signals from stepping the cyclic counter 72. When sector counter 80 reaches 0, AND 75 is deconditioned thereby blocking the RELEASE signals from decrementing held counter 78 and sector counter 80. This will result in the held counter 78 having a count of 0 and the sector counter count being decremented 6 times.

After a sector is transferred from the disk into READ buffer 1, disk interface 3 will generate a SECTOR TRANSFER FROM DISK signal on line 19 which will increment sector counter 80. Sector counter 80 includes an arbitration circuit that deals with the situation of a RELEASE signal and a SECTOR TRANSFER FROM DISK signal being presented to sector counter 80 at the same time. The arbitration circuit will first process the RELEASE signal and then the SECTOR TRANSFER FROM DISK signal before the time of issuance of the next RELEASE signal. The cyclic counter 72 is used to allow settling time for the held counter 78 and the sector counter 80 after being changed.

When the count in sector counter 80 is greater than the count in held counter 78, the RETENTION SINGLE OK TO TRANSFER signal of comparator 77 will be high but not gated through AND 83 since the MULTIPLE BLOCKS signal on line 21-7 is high. When the sector count reaches a count of 10 and the held counter has a count of 0, the RETENTION MULTIPLE OK TO TRANSFER signal of comparator 79 will be high, resulting in the RETENTION OK TO TRANSFER signal on line 107 being high. The RETENTION OK TO TRANSFER signal will be blocked by AND 88 since the READ BLOCK signal is high, indicating a ring mode of operation. When the sector count reaches a count of 10 and the held counter has a count of 0, the output signal on line 109 of comparator 85 will be high, the RING OK TO TRANSFER signal on line 108 will be high and the READ OK TO TRANSFER signal on line 111 will be high. The READ OK TO TRANSFER signal on line 24 from OR 89 will be high and the OK TO TRANSFER signal on line 22 to host interface 2 will be high.

At this time the held counter 78 has a count of 0 and the sector counter 80 has a count of 10. Host interface 2 will initiate the transfer of the 10 sectors from the READ buffer 1 to the host. After each sector is transferred to the host from READ buffer 1, the host interface 2 will generate a SECTOR TRANSFER TO HOST signal on line 15 to held counter 78. The SECTOR TRANSFER TO HOST signal will increment held counter to 1 thereby raising the NOT ZERO signal on line 92 such that AND 70 is conditioned. AND 70 being conditioned will allow the cyclic counter 72 to be stepped by the CLOCK signal. When cyclic counter reaches a count of 011 the RELEASE signal will be high and gated through AND 75. The RELEASE signal will decrement the count in sector counter 80 by 1 and will decrement the count in held counter 78 to 0. Held counter 78 having a count of 0 will result in AND 70 being deconditioned and the CLOCK signal being removed from the cyclic counter 72. Therefore, for each SECTOR TRANSFER TO HOST signal received on line 15 for a READ ring mode operation during the transfer of sectors from the READ buffer 1 to the host, held counter 78 will be incremented from 0 to 1 and then decremented from 1 to 0. After all 10 sectors have been transferred from READ buffer 1 to the host, held counter 78 will have the count of 0 and sector counter 80 will have the count of 0.

While the invention has been particularly shown and described with references to the preferred embodiments thereof, it will be understood by those skilled in the art that changes in form and detail may be made therein without departing from the spirit and scope of the invention. Given the above disclosure of general concepts and specific embodiments, the scope of the protection sought is defined by the following claims.

What is claimed is:

1. A data buffer monitoring system in a disk drive system, said disk drive system including a WRITE buffer for storing a plurality of sectors of data received from a host for storage on disks in said disk drive system, a READ buffer for storing a plurality of sectors of data from said disks for transfer to said host and control means for generating a plurality of control signals for controlling the transfer of sectors of data between said host and said disk drive system in response to READ and WRITE requests for the transfer of one or more sectors of data issued by said host to said disk drive system, said data buffer monitoring system comprising:

a WRITE buffer monitor for receiving a BLOCK COUNT indicating the number of sectors to be transferred and for generating a WRITE OK TO TRANSFER signal when said WRITE buffer has sufficient available space to store the total number of sectors requested by a WRITE request issued by said host, said WRITE buffer monitor comprises:

a held counter for maintaining the count of the number of sectors of data stored in said WRITE buffer which have not been released for transfer to said disk;

a released counter for maintaining the count of the number of sectors of data stored in said WRITE buffer which have been released for transfer to said disk;

a buffer size register for storing the count of the maximum number of sectors of data that can be stored in said WRITE buffer;

a transfer means for generating said WRITE OK TO TRANSFER signal when the sum of said held count in said held register plus said released count in said released counter plus said released BLOCK COUNT is equal to or less than the count in said buffer size register; and a state machine for adding said count in said held counter to said count in said released counter and for making the count in said held counter equal to zero when the sectors of data in said WRITE buffer that were not released for transfer to said disks are released for transfer to said disk;

a READ buffer monitor for generating a READ OK TO TRANSFER signal when said READ buffer has in storage the number of sectors of data available for transfer to said host that was requested for transfer by a READ request issued by said host; and transfer controller for generating an OK TO TRANSFER signal to said control means in said disk drive system when said WRITE buffer monitor generates said WRITE OK TO TRANSFER signal and said host has issued a WRITE request and when said READ buffer monitor generates said READ OK TO TRANSFER signal and said host has issued a READ request whereby said control means in response to said OK TO TRANSFER signal controls the transfer of the number of sectors of data from either said host to said WRITE buffer if a WRITE request was issued by said host or from said READ buffer to said host if a READ request was issued by said host.

2. The data buffer monitoring apparatus of claim 1 wherein:

said READ buffer monitor generates a BUFFER FULL signal to said control means in said disk drive system when said READ buffer is full of sectors of data such that the storage of another sector of data in said READ buffer by said control means would overwrite a sector of data that is available for transfer to said host, whereby said control means in response to said BUFFER FULL signal inhibits the further transfer of said sector of data from said disks to said READ buffer until said BUFFER FULL signal is deactivated by said READ buffer monitor means.

3. The data buffer monitoring apparatus of claim 1 wherein said data buffer monitoring apparatus receives from said control means in said disk drive system:

a READ mode signal connected to said transfer controller, said READ MODE signal when high indicates a READ request from said host and when low indicates a WRITE request from said host;

a WRITE BLOCK signal connected to said WRITE buffer monitor, said WRITE BLOCK signal when high indicates that sector of data stored in said WRITE buffer can be released for transfer to said disks;

a CLOCK signal connected to both said READ buffer monitor and said WRITE buffer monitor;

a BLOCK COUNT signal connected to both said READ buffer monitor and said WRITE buffer monitor, said BLOCK COUNT signal indicating the number of sectors of data that are being requested for transfer by either a READ or WRITE request issued by said host;

a SECTOR TRANSFER FROM HOST signal connected to said WRITE buffer monitor, said SECTOR TRANSFER FROM HOST signal being generated after each sector of data is transferred from said host to said WRITE buffer;

a SECTOR TRANSFER TO HOST signal connected to said READ buffer monitor, said SECTOR TRANSFER TO HOST signal being generated after each sector of data is transferred from READ buffer to said host;

a SECTOR TRANSFER FROM DISK signal connected to said READ buffer monitor, said SECTOR TRANSFER FROM DISK signal being generated after each sector of data is transferred from said disk to said READ buffer;

a SECTOR TRANSFER TO DISK signal connected to said WRITE buffer monitor, said SECTOR TRANSFER TO DISK signal being generated after each sector of data is transferred from said WRITE buffer to said disks;

a MULTIPLE BLOCK signal connected to said READ buffer monitor, said MULTIPLE block signal when high indicating that more than one sector of data is requested to be transferred by either a READ or WRITE request issued by said host and when low indicating that only one sector is requested to be transferred by either a READ or WRITE request issued by said host; and a READ BLOCK signal connected to said READ buffer monitor, said READ BLOCK signal when high indicating a ring mode of operation where the location in said READ buffer is immediately released for the storage of a new sector of data after the sector of data at that location is transferred from the READ buffer to said host and when low indicating a retention mode of operation where a sector of data is maintained in said READ buffer after said sector of data has been transferred from said READ buffer to said host.

4. The data buffer monitoring apparatus of claim 1 wherein:

said state machine generates a series of RELEASE signals equal to the count in said held counter when a WRITE BLOCK signal is changed from low to high;

said held counter receives said RELEASE signals and is decremented by one count for each said RELEASE signal received; and said released counter receives said RELEASE signals and is incremented by one count for each said RELEASE signal received.

5. The data buffer monitoring system of claim 1 wherein:

said held counter receives SECTOR TRANSFER FROM HOST signals and is incremented by one count for each said SECTOR TRANSFER FROM HOST signal received; and said released counter receives SECTOR TRANSFER TO DISK signals and is decremented by one count for each said SECTOR TRANSFER TO DISK signal received.

6. A data buffer monitoring system in a disk drive system, said disk drive system including a WRITE buffer for storing a plurality of sectors of data received from a host for storage on disks in said disk drive system, a READ buffer for storing a plurality of sectors of data from said disks for transfer to said host and control means for generating a plurality of control signals for controlling the transfer of sectors of data between said host and said disk drive system in response to READ and WRITE requests for the transfer of one or more sectors of data issued by said host to said disk drive system, said data buffer monitoring system comprising:

a WRITE buffer monitor for generating a WRITE OK TO TRANSFER signal when said WRITE buffer has sufficient available space to store the total number of sectors requested by a WRITE request issued by said host;

a READ buffer monitor for generating a READ OK TO TRANSFER signal when said READ buffer has in storage the number of sectors of data available for transfer to said host that was requested for transfer by a READ request issued by said host, said READ buffer monitor comprising:

a held counter for maintaining the count of the number of sectors of data stored in said READ buffer which have been released for transfer to said host and are being retained in said READ buffer;

a sector counter for maintaining the count of the number of sectors of data stored in said READ buffer, said count including the number of sectors of data being held in said READ buffer and the number of sectors of data stored in said READ buffer that are available for transfer to said host;

a buffer size register for storing the count of the maximum number of sectors of data that can be stored in said READ buffer;

an adder for generating a summation count equal to sum said count in said held register plus the count in a BLOCK COUNT signal; and a transfer means for generating said READ OK TO TRANSFER signal when the number of sectors of data requested for transfer to said host by a READ request issued by said host is equal to or less than the number of sectors of data in said READ buffer that are available for transfer to said host; and a state machine for reducing said count in said sector counter by the count in said held counter and for reducing the count in said held counter equal to zero when said retained sectors of data in said READ buffer are released thereby providing the locations occupied by said retained sectors of data available for the storage of new sectors of data in said READ buffer; and transfer controller for generating an OK TO TRANSFER signal to said control means in said disk drive system when either said WRITE buffer monitor generates said WRITE OK TO TRANSFER signal and said host has issued a WRITE request or said READ buffer monitor generates said READ OK TO TRANSFER signal and said host has issued a READ request, whereby said control means in response to said OK TO TRANSFER signal controls the transfer of the number of sectors of data from either said host to said WRITE buffer if a WRITE request was issued by said host or from said READ buffer to said host if a READ request was issued by said host.

7. The data buffer monitoring apparatus of claim 6 wherein:

said state machine generates a series of RELEASE signals equal to the count in said held counter when a READ BLOCK signal is changed from low to high;

said held counter receives said RELEASE signals and is decremented by one count for each said RELEASE signal received; and said sector counter receives said RELEASE signals and is decremented by one count for each said RELEASE signal received.

8. The data buffer monitoring apparatus of claim 6wherein:

said held counter receives SECTOR TRANSFER TO HOST signals and is incremented by one count for each said SECTOR TRANSFER TO HOST signal received; and said sector counter receives SECTOR TRANSFER FROM DISK signals and is incremented by one count for each said SECTOR TRANSFER FROM DISK signal received.

9. The data buffer monitoring apparatus of claim 6 wherein said transfer means comprises:

first means for generating a RETENTION SIGNAL OK TO TRANSFER signal when the count in said sector counter is greater than the count in said held counter and a MULTIPLE BLOCKS signal is low;

second means for generating a RETENTION MULTIPLE OK TO TRANSFER signal when the count in said sector counter is equal to or greater than said summation count in said adder and said MULTIPLE BLOCKS signal is high;

third means for generating a RETENTION OK TO TRANSFER signal whenever either said first means generates said RETENTION SIGNAL OK TO TRANSFER signal or said second means generates said RETENTION MULTIPLE OK TO TRANSFER signal;

fourth means for generating a RING OK TO TRANSFER signal when said count in said sector counter is equal to or greater than the count of said BLOCK COUNT signal and said count in said held counter is equal to zero; and fifth means for generating a READ OK TO TRANSFER signal when either said third means generates said RETENTION OK TO TRANSFER signal and a READ BLOCK signal is low or said fourth means generates said RING OK TO TRANSFER signal and said READ BLOCK signal is high.

10. The data buffer monitoring system of claim 6 wherein said transfer means further comprises:

sixth means for generating a BUFFER FULL signal when said count in said sector counter is equal to said count in said buffer size register indicating that the storage of another sector of data in said READ buffer by said control means would overwrite a sector of data that is available for transfer to said host, whereby said control means in response to said BUFFER FULL signal inhibits the further transfer of said sector of data from said disks to said READ buffer until said BUFFER FULL signal is deactivated by said READ buffer monitor means.

11. The data buffer monitoring apparatus of claim 6 wherein said data buffer monitoring apparatus receives from said control means in said disk drive system:

a READ mode signal connected to said transfer controller, said READ MODE signal when high indicates a READ request from said host and when low indicates a WRITE request from said host;

a WRITE BLOCK signal connected to said WRITE buffer monitor, said WRITE BLOCK signal when high indicates that sector of data stored in said WRITE buffer can be released for transfer to said disks;

a CLOCK signal connected to both said READ buffer monitor and said WRITE buffer monitor;

a BLOCK COUNT signal connected to both said READ buffer monitor and said WRITE buffer monitor, said BLOCK COUNT signal indicating the number of sectors of data that are being requested for transfer by either a READ or WRITE request issued by said host;

a SECTOR TRANSFER FROM HOST signal connected to said WRITE buffer monitor, said SECTOR TRANSFER FROM HOST signal being generated after each sector of data is transferred from said host to said WRITE buffer;

a SECTOR TRANSFER TO HOST signal connected to said READ buffer monitor, said SECTOR TRANSFER TO HOST signal being generated after each sector of data is transferred from READ buffer to said host;

a SECTOR TRANSFER FROM DISK signal connected to said READ buffer monitor, said SECTOR TRANSFER FROM DISK signal being generated after each sector of data is transferred from said disk to said READ buffer;

a SECTOR TRANSFER TO DISK signal connected to said WRITE buffer monitor, said SECTOR TRANSFER TO DISK signal being generated after each sector of data is transferred from said WRITE buffer to said disks;

a MULTIPLE BLOCK signal connected to said READ buffer monitor, said MULTIPLE block signal when high indicating that more than one sector of data is requested to be transferred by either a READ or WRITE request issued by said host and when low indicating that only one sector is requested to be transferred by either a READ or WRITE request issued by said host; and a READ BLOCK signal connected to said READ buffer monitor, said READ BLOCK signal when high indicating a ring mode of operation where the location in said READ buffer is immediately released for the storage of a new sector of data after the sector of data at that location is transferred from the READ buffer to said host and when low indicating a retention mode of operation where a sector of data is maintained in said READ buffer after said sector of data has been transferred from said READ buffer to said host.

12. A data buffer monitoring system in a disk drive system, said disk drive system including a WRITE buffer for storing a plurality of sectors of data received from a host for storage on disks in said disk drive system, a READ buffer for storing a plurality of sectors of data from said disks for transfer to said host and control means for generating a plurality of control signals for controlling the transfer of sectors of data between said host and said disk drive system in response to READ and WRITE requests for the transfer of one or more sectors of data issued by said host to said disk drive system, said data buffer monitoring system comprising:

a WRITE buffer monitor for receiving a BLOCK COUNT from the host indicating the number of sectors to be transferred and for generating a WRITE OK TO TRANSFER signal when said WRITE buffer has sufficient available space to store the total number of sectors requested by a WRITE request issued by said host, said WRITE buffer monitor comprises:

a held counter for maintaining the count of the number of sectors of data stored in said WRITE buffer which have not been released for transfer to said disk;

a released counter for maintaining the count of the number of sectors of data stored in said WRITE buffer which have been released for transfer to said disk;

a buffer size register for storing the count of the maximum number of sectors of data that can be stored in said WRITE buffer; and a transfer means for generating said WRITE OK TO TRANSFER signals when the sum of said held count in said held register plus the released count in said released counter plus said received BLOCK COUNT is equal to or less than the count in said buffer size register; and a state machine for adding said count in said held counter to said count in said released counter and for making the count in said held counter equal to zero when the sectors of data in said WRITE buffer that were not released for transfer to said disks are released for transfer to said disk;

a READ buffer monitor for generating a READ OK TO TRANSFER signal when said READ buffer has in storage the number of sectors of data available for transfer to said host that was requested for transfer by a READ request issued by said host, said READ buffer monitor comprises;

a held counter for maintaining the count of the number of sectors of data stored in said READ buffer which have been released for transfer to said host and are being retained in said READ buffer;

a sector counter for maintaining the count of the number of sectors of data stored in said READ buffer, said count including the number of sectors of data being held in said READ buffer and the number of sectors of data stored in said READ buffer that are available for transfer to said host;

a buffer size register for storing the count of the maximum number of sectors of data that can be stored in said READ buffer;

an adder for generating a summation count equal to sum said count in said held register plus the count in said BLOCK COUNT signal; and a transfer means for generating said READ OK TO TRANSFER signal when the number of sectors of data requested for transfer to said host by a READ request issued by said host is equal to or less than the number of sectors of data in said READ buffer that are available for transfer to said host; and transfer controller for generating an OK TO TRANSFER signal to said control means in said disk drive system when either said WRITE buffer monitor generates said WRITE OK TO TRANSFER signal and said host has issued a WRITE request or said READ buffer monitor generates said READ OK TO TRANSFER signal and said host has issued a READ request, whereby said control means in response to said OK TO TRANSFER signal controls the transfer of the number of sectors of data from either said host to said WRITE buffer if a WRITE request was issued by said host or from said READ buffer to said host if a READ request was issued by said host.

13. The data buffer monitoring apparatus of claim 12 wherein:

said state machine generates a series of RELEASE signals equal to the count in said held counter when a WRITE BLOCK signal is changed from low to high;

said held counter receives said RELEASE signals and is decremented by one count for each said RELEASE signal received; and said released counter receives said RELEASE signals and is incremented by one count for each said RELEASE signal received.

14. The WRITE buffer monitor of the data buffer monitoring system of claim 12 wherein:

said held counter received SECTOR TRANSFER FROM HOST signals and is incremented by one count for each said SECTOR TRANSFER FROM HOST signal received; and said released counter receives SECTOR TRANSFER TO DISK signals and is decremented by one count for each said SECTOR TRANSFER TO DISK signal received.

15. The data buffer monitoring apparatus of claim 12 wherein said READ buffer monitor further comprises:

a state machine for reducing said count in said sector counter by the count in said held counter and for reducing the count in said held counter equal to zero when said retained sectors of data in said READ buffer are released thereby providing the locations occupied by said retained sectors of data available for the storage of new sectors of data in said READ buffer.

16. The READ buffer monitor of the data buffer monitoring apparatus of claim 12 wherein:

said held counter receives SECTOR TRANSFER TO HOST signals and is incremented by one count for each said SECTOR TRANSFER TO HOST signal received; and said sector counter receives SECTOR TRANSFER FROM DISK signals and is incremented by one count for each said SECTOR TRANSFER FROM DISK signal received.

17. The data buffer monitoring apparatus of claim 12 wherein said transfer means of said READ buffer monitor comprises:

first means for generating a RETENTION SIGNAL OK TO TRANSFER signal when the count in said sector counter is greater than the count in said held counter and a MULTIPLE BLOCKS signal is low;

second means for generating a RETENTION MULTIPLE OK TO TRANSFER signal when the count in said sector counter is equal to or greater than said summation count in said adder and said MULTIPLE BLOCKS signal is high;

third means for generating a RETENTION OK TO TRANSFER signal when said first means generates said RETENTION SIGNAL OK TO TRANSFER signal and when said second means generates said RETENTION MULTIPLE OK TO TRANSFER signal;

fourth means for generating a RING OK TO TRANSFER signal when said count in said sector counter is equal to or greater than the count of said BLOCK COUNT signal and said count in said held counter is equal to zero; and fifth means for generating a READ OK TO TRANSFER signal when either said third means generates said RETENTION OK TO TRANSFER signal and a READ BLOCK signal is low or said fourth means generates said RING OK TO TRANSFER signal and said READ BLOCK signal is high.

18. The data buffer monitoring system of claim 12 wherein said transfer means of said READ buffer monitor further comprises:

sixth means for generating a BUFFER FULL signal when said count in said sector counter is equal to said count in said buffer size register indicating that the storage of another sector of data in said READ buffer by said control means would overwrite a sector of data that is available for transfer to said host, whereby said control means in response to said BUFFER FULL signal inhibits the further transfer of said sector of data from said disks to said READ buffer until said BUFFER FULL signal is deactivated by said READ buffer monitor means.

19. The data buffer monitoring apparatus of claim 12 wherein said data buffer monitoring apparatus receives from said control means in said disk drive system:

a READ mode signal connected to said transfer controller, said READ MODE signal when high indicates a READ request from said host and when low indicates a WRITE request from said host;

a WRITE BLOCK signal connected to said WRITE buffer monitor, said WRITE BLOCK signal when high indicates that sector of data stored in said WRITE buffer can be released for transfer to said disks;

a CLOCK signal connected to both said READ buffer monitor and said WRITE buffer monitor;

a BLOCK COUNT signal connected to both said READ buffer monitor and said WRITE buffer monitor, said BLOCK COUNT signal indicating the number of sectors of data that are being requested for transfer by either a READ or WRITE request issued by said host;

a SECTOR TRANSFER FROM HOST signal connected to said WRITE buffer monitor, said SECTOR TRANSFER FROM HOST signal being generated after each sector of data is transferred from said host to said WRITE buffer;

a SECTOR TRANSFER TO HOST signal connected to said READ buffer monitor, said SECTOR TRANSFER TO HOST signal being generated after each sector of data is transferred from READ buffer to said host;

a SECTOR TRANSFER FROM DISK signal connected to said READ buffer monitor, said SECTOR TRANSFER FROM DISK signal being generated after each sector of data is transferred from said disk to said READ buffer;

a SECTOR TRANSFER TO DISK signal connected to said WRITE buffer monitor, said SECTOR TRANSFER TO DISK signal being generated after each sector of data is transferred from said WRITE buffer to said disks;

a MULTIPLE BLOCK signal connected to said READ buffer monitor, said MULTIPLE block signal when high indicating that more than one sector of data is requested to be transferred by either a READ or WRITE request issued by said host and when low indicating that only one sector is requested to be transferred by either a READ or WRITE request issued by said host; and a READ BLOCK signal connected to said READ buffer monitor, said READ BLOCK signal when high indicating a ring mode of operation where the location in said READ buffer is immediately released for the storage of a new sector of data after the sector of data at that location is transferred from the READ buffer to said host and when low indicating a retention mode of operation where a sector of data is maintained in said READ buffer after said sector of data has been transferred from said READ buffer to said host.

20. The data buffer monitoring apparatus of claim 15 wherein said state machine generates a series of RELEASE signals equal to the count in said held counter when a READ BLOCK signal is changed from low to high;

said held counter receives said RELEASE signals and is decremented by one count for each said RELEASE signal received; and said sector counter receives said RELEASE signals and is decremented by one count for each said RELEASE signal received.

* * * * *

UNITED STATES PATENT AND TRADEMARK OFFICE
CERTIFICATE OF CORRECTION

PATENT NO.  : 5,561,823
DATED       : October 1, 1996
INVENTOR(S) : Steve Anderson It is certified that error appears in the above-indentified patent and that said Letters Patent is hereby corrected as shown below:

```
ABSTRACT,  line 11, "store" should be --stored--.
ABSTRACT,  line 18, "request" should be --requested--.
Column 5,  line 12, "49" should be --47--.
Column 5,  line 24, "input-of" should be --input of--.
Column 7,  line 55, "contain" should be --contains--.
Column 8,  line 4,  "SINGLE" should be --SIGNAL--.
Column 8,  line 10, "SINGLE" should be --SIGNAL--.
Column 8,  line 29, "SINGLE" should be --SIGNAL--.
Column 9,  line 2,  "SINGLE" should be --SIGNAL--.
Column 10, line 39, "SINGLE" should be --SIGNAL--.
```

Signed and Sealed this

Twenty-eighth Day of October, 1997

Attest:

*Attesting Officer*

BRUCE LEHMAN

*Commissioner of Patents and Trademarks*